United States Patent
Yamashita et al.

(10) Patent No.: US 8,044,547 B2
(45) Date of Patent: Oct. 25, 2011

(54) RADIAL-DIRECTION GAP TYPE MAGNET MOTOR

(75) Inventors: Fumitoshi Yamashita, Nara (JP); Hiroshi Murakami, Osaka (JP); Yukihiro Okada, Osaka (JP); Kiyomi Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 263 days.

(21) Appl. No.: 12/312,792

(22) PCT Filed: Nov. 15, 2007

(86) PCT No.: PCT/JP2007/072174
§ 371 (c)(1), (2), (4) Date: May 26, 2009

(87) PCT Pub. No.: WO2008/065898
PCT Pub. Date: Jun. 5, 2008

(65) Prior Publication Data
US 2010/0066192 A1    Mar. 18, 2010

(30) Foreign Application Priority Data

Nov. 27, 2006    (JP) ................................ 2006-318254

(51) Int. Cl.
*H02K 1/27*    (2006.01)
*H02K 15/03*    (2006.01)
(52) U.S. Cl. .................... 310/156.43; 148/101; 148/103
(58) Field of Classification Search . 310/156.43–156.46
See application file for complete search history.

(56) References Cited

U.S. PATENT DOCUMENTS

| | | | | |
|---|---|---|---|---|
| 7,202,585 B2* | 4/2007 | Ohata et al. | ............. | 310/156.43 |
| 7,228,616 B2* | 6/2007 | Stephens | ........................ | 29/598 |
| 7,453,181 B2* | 11/2008 | Kikuchi et al. | .......... | 310/156.78 |

(Continued)

FOREIGN PATENT DOCUMENTS

JP    2002-191144    7/2002

(Continued)

OTHER PUBLICATIONS

Fumitoshi Yamashita et al., "Jiko Soshikika Radial Jiki Ihosei Kidorui Bond Jishaku," Matsushita Technical Journal, Feb. 2005, vol. 51, No. 1, pp. 56-60.

(Continued)

*Primary Examiner* — Burton Mullins
(74) *Attorney, Agent, or Firm* — Brinks Hofer Gilson & Lione

(57) ABSTRACT

In a radial-direction gap type magnet motor, when an energy density increases, a direction change $M\theta/\phi p$ of a static magnetic field with respect to a mechanic angle between different poles increases in an exponential manner and thus to decrease a cogging torque of the motor is not compatible to increase a torque density. In order to solve the problem, assuming that $\phi t$ denotes a mechanic angle of a stator iron core teeth, $\phi p$ denotes a mechanical angle of a magnetic pole, and $M\theta$ denotes an angle of a static magnetic field with respect to a circumferential tangential line of a radial magnetic pole center, a radial-direction type magnet motor in which $\phi t<\phi p$, $M\theta$ in a magnetic pole center region is 75 to 90°, and $M\theta/\phi p \leq 7$ is satisfied in the magnetic pole end region of $\phi p \times 0.1°$, and further, a static magnetic field generating source is configured as a magnetic anisotropic magnetic pole having an energy density (BH) max $\geq 150$ kJ/m³ is provided.

11 Claims, 12 Drawing Sheets

U.S. PATENT DOCUMENTS

| | | | | |
|---|---|---|---|---|
| 7,569,961 | B2* | 8/2009 | Miyashita | 310/156.47 |
| 2009/0007417 | A1* | 1/2009 | Yamashita et al. | 29/608 |

FOREIGN PATENT DOCUMENTS

| | | |
|---|---|---|
| JP | 2002-262533 | 9/2002 |
| JP | 2006-080115 | 3/2006 |

OTHER PUBLICATIONS

J. Schulze, "Application of High Performance Magnets for Small Motors," Proc. of the 18th International Workshop on High Performance Magnets and Their Applications, 2004, pp. 908-915.

Y. Pang et al., "Comparison of Brushless Motors Having Halbach Magnetized Magnets and Shaped Parallel Magnetized Magnets," Proc. of the 18th International Workshop on High Performance Magnets and Their Applications, 2004, pp. 400-407.

W. Rodewald et al., "Properties and Applications of High Performance Magnets," Proc. of the 18th International Workshop on High Performance Magnets and Their Applications, 2004, pp. 52-63.

Atsushi Matsuoka et al., "Examination of Performance Improvement Brushless DC Fan Motors," Rotating Equipment Seminar of Electric Association, the Institute of Electrical Engineers of Japan (IEEJ), RM-01-161, 2001, pp. 13-18.

D. Howe et al., "Application of Halbach Cylinders to Electrical Machine," Proc. of the 16th International Workshop on Rare-Earth Magnets and Their Applications, 2000, pp. 903-922.

Takahiko Iriyama, "Development Trends of High-Performance Rare-Earth Bonded Magnets," Ministry of Education, Culture, Sports, Science and Technology, Innovation Creation Project/Symposium of Efficient Usage of Rare-Earth Resource and Advanced Material, 2002, pp. 19-26.

B. H. Rabin et al., "Recent Developments in Nd-Fe-B Powder," 120th Topical Symposium of the Magnetic Society of Japan, 2001, pp. 23-28.

M. Ma, "Recent Powder Development at Magnequench," Polymer Bonded Magnets 2002.

S. Hirosawa et al., "Structure and Magnetic Properties of $Nd_2Fe_{14}B$/FexB-type Nanocomposites Prepared by Strip Casting," 9th Joint MMM/INTERMAG, FG-05, 2004.

H. A. Davies et al., "Nanophase Pr and Nd/Pr-Based Rare Earth-Iron-Boron Alloys," Proc. of 16th International Workshop on Rare-Earth Magnets and Their Applications, 2000, pp. 485-495.

R.W. Lee et al., "Processing of Neodymium-Iron-Baron Melt-Spun Ribbons to Fully Dense Magnets," IEEE Transactions on Magnetics, Sep. 1985, vol. 21, pp. 1958-1963.

A. Kawamoto et al., "$Sm_2Fe_{17}N_3$ Magnet Powder Made by Reduction and Diffusion Method," IEEE Transactions on Magnetics, Sep. 1999, vol. 35, No. 5, pp. 3322-3324.

T. Takeshita et al., "Magnetic Properties and Microstructures of the NdFeB Magnet Powder Produced by Hydrogen Treatment," Proc. of the 10th International Workshop on Rare-Earth Magnets and Their Applications, pp. 551-557.

International Search Report issued Feb. 19, 2008 in International application No. PCT/JP2007/072174, 2 pages.

* cited by examiner

○: Before heat treatment
●: After heat treatment 170C° 20min

RADIAL-DIRECTION GAP TYPE MAGNET MOTOR

This Application is a U.S. National Phase Application of PCT International Application No. PCT/JP2007/072174 filed Nov. 15, 2007 which claims priority to Japanese Application No. JP2006-318254 filed Nov. 27, 2006.

TECHNICAL FIELD

The present invention relates to a radial-direction gap type magnet motor which includes a magnetic anisotropic magnetic pole having a non-radial magnetic anisotropic region provided at a magnetic pole end and which is characterized with a low cogging torque and a high torque density. More specifically, the present invention relates to power saving, resource saving, decrease in size, and silencing of a radial-direction gap type magnet motor which has a power of approximately 50 W or less and is widely used as various driving sources for an electric home appliance, an air-conditioning device, an information device, and the like.

BACKGROUND ART

A motor can be regarded as a multi-functional component which includes a rotor, a shaft, a bearing, a stator, and the like obtained by highly precisely processing various materials such as steel, non-ferrous metal, and polymer and which converts electric energy into mechanic energy by the combination thereof. In recent years, a so-called permanent magnet type motor which uses a magnet capable of attracting or repelling other magnetic materials and of permanently generating a static magnetic field without an external energy is widely used. From the viewpoint of physics, the magnet is different from other magnetic materials in that an effective magnetization remains even after removing an external magnetic field. When a heat or a comparatively large inverse magnetic field is applied, a magnetization inversion (demagnetization) eventually occurs and then the magnetization reduces with the demagnetization. An important characteristic value of the magnet is an energy density (BH) max. The energy density (BH) max shows potential energy of the magnet by the unit of volume.

Incidentally, the performance of the strong attracting or repelling capability of the magnet does not contribute to improve the high performance of every type of the motor. However, in Non-patent Document 1, on the basis of a relationship between a residual magnetic flux density Br corresponding to one of basic characteristics of the magnet and a motor constant KJ (KJ is a ratio between an output torque KT and a square root $\sqrt{R}$ of a resistance loss) corresponding to an index of a motor performance, it is described that an increase in energy density (BH) max of the magnet induces a higher torque density in the radial-direction gap type magnet motor, which is a target of the invention, in the state where a motor diameter, a rotor diameter, a gap, a soft magnetic material, a magnet dimension, and the like are fixed.

However, the increase in energy density (BH) max of the magnet induces the higher torque density in the radial-direction gap type magnet motor, which is a target of the invention, but since a stator iron core of the motor is provided with teeth forming a part of a magnetic circuit and a slot accommodating wound wires, the permeance changes with the rotation. For this reason, the increase in energy density (BH) max of the magnet increases a torque pulsation, that is, a cogging torque. The increase in cogging torque causes bad influences such as the disturbance of a smooth rotation of the motor, the increase in vibration or noise of the motor, and the deterioration in rotation control performance.

In order to avoid such bad influences, many studies on the cogging torque reduction of the radial-direction gap type magnet motor have been carried out in the past.

First, regarding the magnetic pole having an even thickness in a magnetization direction, making the thickness of the magnet uneven is considered. For example, in Non-patent Document 2, it is described that the cogging torque becomes minimum when the radial-direction gap type magnet motor shown in FIG. 9A including magnetic pole 1 of an uneven thickness, stator iron core 2, stator iron core slot 3, and stator iron core teeth 4 is allowed to have the 12-pole-18-slot uneven-thickness magnetic pole with a residual magnetization Br of 1.2 T, a maximum thickness at the magnetic pole center of 3 mm, and a minimum thickness at both magnetic pole ends of 1.5 mm. Additionally, in this case, the thickness is unevened from the outer diameter side of the magnetic pole. However, it is known that the cogging torque can be reduced even in the magnetic pole whose thickness is unevened from the inner diameter side of the magnetic pole.

In addition, in Non-patent Document 2, in order to minimize the cogging torque by making the thickness of the magnetic pole uneven as shown in FIG. 9A, the minimum thickness of both magnetic pole ends is required to be unevened so that the thickness is about a half of the maximum thickness of the magnetic pole center. Accordingly, if the thickness of the magnetic pole, that is, the magnetization direction (thickness) becomes thinner, a sufficient advantage cannot be obtained even when the thickness of the magnetic pole is unevened so as to minimize the cogging torque. In addition, the magnetic pole is mechanically weak in general, and thus the processing thereof becomes difficult.

Meanwhile, regarding the magnetic pole whose thickness is thin in the magnetization direction, there is known a method of skewing the magnetic pole as disclosed in FIG. 9B in Non-patent Document 3 or a method of continuously removing a magnetic pole area between magnetic poles as disclosed in FIG. 9C in Non-patent Document 4.

According to the summary of the known techniques described above, the magnetic pole end of the thick magnetic pole is thinned by about a half so as to broaden a gap between itself and the stator iron core or the area between the magnetic poles of the thin magnetic pole is reduced. Accordingly, the amount of the static magnetic field Ms, generated from the magnetic pole and flowing through the stator iron core in the form of the magnetic flux Φ, is suppressed. As a result, in theses methods, the torque density decreases by 10 to 15% in general due to the reduction in cogging torque. Accordingly, the cogging torque reduction methods using the known techniques shown in FIGS. 9A, 9B, and 9C are contrary to the technique in which the increase in energy density (BH) max of the magnet induces the increase in torque density in the radial-direction gap type magnet motor.

Meanwhile, as in Non-patent Document 5, a cogging torque reduction method of the radial-direction gap type magnet motor is reported which adopts an $Nd_2Fe_{14}B$-based rare-earth sintered magnet whose thickness in the magnetization direction is as thin as 1.2 mm and the residual magnetization Mr has a high energy density of 1 T. In this cogging torque reduction method, as shown in FIGS. 9A, 9B, and 9C, the thickness in the magnetization direction or the magnetic pole area is not decreased. That is, as shown in FIGS. 10A to 10D, a so-called Halbach Cylinder is shown each magnetic pole of which is formed of two to five divided sections, and the magnetization direction (anisotropic direction) for each divided section is adjusted stepwisely. Here, in the drawing, the suffixes (2) to (5) indicate the number of two to five divided sections of one magnetic pole. In addition, the direction indicated by the arrow of each divided section indicates a direction of the magnetization vector M along the oriented magnetization easy axis (C-axis), that is, the anisotropic direction.

When the 12-pole-18-slot radial-direction gap type magnet motor is manufactured by adopting the magnetic pole having the above-described configuration, the plotted cogging torque with respect to the number of divided magnetic pole sections of the magnetic pole is shown in FIG. 11. That is, the number N of the divided magnetic pole sections of the magnetic pole and the cogging torque Tcog satisfy the exponential approximation as Tcog=61.753 exp (−0.1451 N). In addition, FIG. 11 shows that the state where Mθ/φp minutely and continuously changes in a specific direction particularly between different poles is ideal when Mθ denotes an angle formed between the magnetization vector M at an arbitrary mechanic angle φ. However, in the $Nd_2Fe_{14}B$-based rare-earth sintered magnet whose thickness is 1.2 mm and whose residual magnetization Mr has the high energy density of 1 T, it is difficult to prepare plural magnetic pole sections having different anisotropic directions, to minutely and regularly arrange the magnetic pole divided sections, and to form the magnetic pole with high dimensional precision. For this reason, it is very difficult to manufacture a multi-pole rotor having an integer number of the magnetic poles and a radial-direction gap type magnet motor adopting the multi-pole rotor. In addition, it is easily supposed that manufacturing such multi-pole rotor or a radial-direction gap type magnet motor is not compatible with economical efficiency.

An object of the invention is to provide a new cogging torque reduction method of a radial-direction gap type magnet motor which does not reduce the volume or area of the magnetic pole of, for example, a magnetic anisotropic magnetic pole whose thickness is as thin as 1.5 mm, and is difficult to be unevened, and whose energy density is high.

More specifically, the present invention took note of the disclosure in Non-patent Document 5 that the number N of divided sections of the magnetic pole and the cogging torque Tcog satisfy the exponential approximation as Tcog=61.753 exp (−0.1451 N). Particularly, when φp denotes the mechanic angle of the magnetic pole and Mθ denotes an angle formed between the circumferential tangential line of the magnetic pole and the magnetization vector M in the region of φp×0.1° at a position between different poles in which N and S poles are switched, it is an object of the invention to simultaneously obtain the contrary advantages, that is, the suppression of the cogging torque and the increase in torque density using the magnetic anisotropic magnetic pole having the high energy density by specifying the continuous change Mθ/φp of the magnetization vector angle Mθ with respect to the mechanic angle φp of the magnetic pole. Accordingly, it is possible to provide the radial-direction gap type magnet motor which adopts the magnetic anisotropic magnetic pole having the energy density (BH) max≧150 kJ/m³ and which simultaneously realizes the contrary advantages, that is, the suppression of the cogging torque and the increase in energy density.

A radial-direction gap type magnet motor according to the invention includes a magnetic anisotropic magnetic pole in which assuming that φt denotes a mechanic angle of a stator iron core teeth of the radial-direction gap type magnet, φp denotes a mechanical angle of a magnetic pole, and Mθ denotes an angle of a magnetization vector with respect to a circumferential tangential line of the magnetic pole, Mθ of a mechanical angle region φp=φt of a magnetic pole center region facing φt is set to be 75 to 90° and more desirably 90° so as to have an average error within 5°, and Mθ/φp≦7 is satisfied in the region of φp×0.1° at a position of a circumferential magnetic pole end, that is, a position between different poles. The Mθ and φp have precision at which the linear approximation having the correlation coefficient of 0.99 or more is satisfied.

In the magnetic anisotropic magnetic pole, when Hθ denotes an angle formed between the direction of the homogeneous external magnetic field Hex and the tangential line of the mechanic angle φp at the inner and outer surfaces of the magnetic pole, first, a deformed magnetic pole having the inner and outer circumferential sections causing the angle change Hθ/φp is prepared by the application of the orientated magnetic field using the homogeneous external magnetic field Hex. Next, the deformed magnetic pole is subjected to a heat and an external force to thereby obtain a predetermined circular arc magnetic pole. Then, the obtained circular arc magnetic pole is applied with the homogeneous external magnetic field Hex again in the same direction as the oriented direction so as to be magnetized. At the time when the homogeneous external magnetic field Hex is applied to the circular arc magnetic pole, the respective parts of the magnetic pole are magnetized in the direction of the magnetization easy axis (C-axis). Accordingly, the magnetization vector angle Mθ with respect to the circumferential tangential line of the circular arc magnetic pole is equal to Hθ with a certain degree of error.

In order to minimize the error between the Mθ and Hθ, the shape of the deformed magnetic pole is desirably obtained in such a manner that a rigid body forming the deformed magnetic pole and having the arbitrary Hθ/φp moves in rotation, only the direction of the magnetization easy axis (C-axis) changes without breaking down the anisotropic degree, and the nonlinear structure analysis of the rigid body aggregation is carried out. In addition, the rotary movement of the rigid body aggregation having the arbitrary Hθ/φp, where only the direction of the magnetization easy axis (C-axis) changes without breaking down the anisotropic degree, is carried out by using the rheology of the molten linear polymer such as a shear flow action, an extension flow action, a viscous deformation having the shear flow action and the extension flow action caused by the heat, the external force, and the like. In addition, it is desirable that the magnetic pole has the magnetic performance such of the residual magnetization Mr≧0.95 T, the intrinsic magnetic coercive force HcJ≧0.9 MA/m, and the energy density (BH) max≧150 kJ/m³.

As a configuration of the magnetic anisotropic magnetic pole suitable for ensuring the magnetic performance of the energy density (BH) max≧150 kJ/m³ and plastic workability, for example, a macro structure is provided in which $Nd_2Fe_{14}B$-based rare-earth magnet particles each having an average particle diameter of 150 μm or less are isolated by a matrix (continuous phase) of a bonding agent and $Sm_2Fe_{17}N_3$-based rare-earth magnet fine powders each having an average particle diameter of 3 to 5 μm. Desirably, the volume ratio of a magnet material having an energy density (BH) max≧270 kJ/m³ to the magnetic pole is set to be 80 vol. % or more.

A magnetic isotropic magnet can be freely magnetized in a direction of a magnetization field and in any direction in accordance with a magnetic field strength distribution. For this reason, it is possible to provide a magnetization pattern indicated by the circular arc arrow in magnetic pole 1 of FIG. 12 by optimization of the shape of a magnetization yoke and a magnetomotive force. Accordingly, it is possible to easily adjust a gap magnetic flux density distribution between a magnetic pole and a stator iron core to a sine wave shape. Thus, the cogging torque reduction in the radial-direction gap type magnet motor can be easily carried out compared with the case where a thin magnetic pole is formed of a magnetic anisotropic magnet material.

A study on the isotropic rare-earth magnet material seems to be started by R. W. Lee and others who reported that an isotropic $Nd_2Fe_{14}B$-based bond magnet having the energy density (BH) max of 72 kJ/m$^3$ can be formed when a rapidly-solidified ribbon having the energy density (BH) max of 111 kJ/m$^3$ is fixed by a resin (see "Hot-pressed Neodymium-Iron-Boron magnets" written by R. W. Lee, E. G. Brewer, and N. A. Schaffel, IEEE Trans. Magn., Vol. 21, 1958 (1985)). Since then, studies on the isotropic rare-earth magnet material mainly obtained by the rapid solidification of the rare-earth-iron-based molten alloy have been actively carried out from the late in 1980s. For example, there are many isotropic magnetic materials of different powder shapes to be industrially usable, such as $Nd_2Fe_{14}B$, $Sm_2Fe_{17}N_3$, or a nanocomposite magnet material obtained by using an exchange bonding based on a microscopic structure of αFe, FeB, and $Fe_3B$ with $Nd_2Fe_{14}B$ and $Sm_2Fe_{17}N_3$, in addition to isotropic magnet materials obtained by the micro control of various alloy structures. For example, see Non-patent Documents 6 to 10. Particularly, in Non-patent Document 10, H. A. Davies et al. proposed a material having an isotropy and an energy density (BH) max of 220 kJ/m$^3$.

However, the energy density (BH) max of the isotropic magnet materials which can be used in industries is 134 kJ/m$^3$ at best. The energy density (BH) max of the isotropic $Nd_2Fe_{14}B$-based bond magnet which is generally used in the magnet motor represented as a small-sized radial-direction gap type magnet motor having a power of 50 W or less is approximately 80 kJ/m$^3$ or less. That is, although more than 20 years have passed since the isotropic $Nd_2Fe_{14}B$-based bond magnet having the energy density (BH) max of 72 kJ/m$^3$ was formed from the ribbon having the energy density (BH) max of 111 kJ/m$^3$ by R. W. Lee and others in 1985, the improvement in energy density (BH) max is less than 10 kJ/m$^3$.

Accordingly, it cannot be expected to increase the energy density and torque density of the radial-direction gap type magnet motor which is a target of the invention by depending on the slow improvement of isotropic magnetic materials.

Meanwhile, changing of an isotropic magnet to an anisotropic magnet is usually accompanied with the increase of energy density (BH) max. For this reason, in the radial-direction gap type magnet motor which is a target of the invention, a higher torque density can be obtained, but the cogging torque increases.

Non-patent Document 1: "Application of high performance magnets for small motors" written by J. Schulze, Proc. of the 18th international workshop on high performance magnets and their applications, 2004, pp. 908-915

Non-patent Document 2: "Comparison of brushless motors having halbach magnetized magnets and shaped parallel magnetized magnets" written by Y. Pang, Z. Q. Zhu, S. Ruangsinchaiwanich, and D. Howe, Proc. of the 18th international workshop on high performance magnets and their applications, 2004, pp. 400-407

Non-patent Document 3: "Properties and applications of high performance magnets" written by W. Rodewald, W. Rodewald, and M. Katter, Proc. of the 18th international workshop on high performance magnets and their applications, 2004, pp. 52-63

Non-patent Document 4: "Investigation of Increase in Performance of Blowing Brushless DC Motor" written by Atsushi Matsuoka, Togo Yamazaki, and Hitoshi Kawaguchi, Rotating Equipment Seminar of Electric Association, The Institute of Electrical Engineers of Japan (IEEJ), RM-01-161, 2001

Non-patent Document 5: "Application of halbach cylinders to electrical machine" written by D. Howe and Z. Q. Zhu, Proc. of the 17th int. workshop on rare earth magnets and their applications, 2000, pp. 903-922

Non-patent Document 6: "Development Tendency of High-performance Rare-earth Bond Magnet" written by Takahiko Iriyama, Ministry of Education, Culture, Sports, Science and Technology, Innovation Creation Project/Symposium of Efficient Usage of Rare-earth Resource and Advanced Material, 2002, pp. 19-26

Non-patent Document 7: "Recent developments in Nd—Fe—B powder" written by B. H. Rabin, and B. M. Ma, 120th Topical Symposium of the Magnetic Society of Japan, 2001, pp. 23-28

Non-patent Document 8: "Recent powder development at magnequench" written by B. M. Ma, Polymer Bonded Magnets 2002, 2002

Non-patent Document 9: "Structure and magnetic properties of $Nd_2Fe_{14}B$/FexB-type nanocomposite permanent magnets prepared by strip casting" written by S. Hirasawa, H. Kanekiyo, T. Miyoshi, K. Murakami, Y. Shigemoto, and T. Nishiuchi, 9th Joint MMM/INTERMAG, FG-05, 2004

Non-patent Document 10: "Nanophase Pr and Nd/Pr based rare-earth-iron-boron alloys" written by H. A. Davies, J. I. Betancourt, and C. L. Harland, Proc. of 16th Int. Workshop on Rare-Earth Magnets and Their Applications, 2000, pp. 485-495

DISCLOSURE OF THE INVENTION

The invention is directed in a radial-direction gap type magnet motor to increase the energy density (BH) max, which is a disadvantage of an isotropic magnet, by approximately two times or more by adopting a magnetic anisotropic magnetic pole and accordingly to increase the torque density and to reduce the cogging torque so as to be not more than that of the isotropic magnet having the same shape.

In the known techniques, when the energy density (BH) max increases, a change Mθ/ϕp of the magnetization vector angle Mθ with respect to the mechanic angle ϕp between different poles tends to increase in an exponential manner. However, according to the invention, the Mθ/ϕp of the magnetic anisotropic magnetic pole can be suppressed so as to be not more than that of the isotropic magnet by means of the control of the magnetization vector angle Mθ, that is, the anisotropic direction control. As a result, irrespective of the magnetic anisotropic magnetic pole whose energy density (BH) max is larger by approximately two to ten times, it is possible to increase the torque density without increasing the cogging torque of the radial-direction gap type magnet motor. Accordingly, it is possible to effectively improve the power saving, resource saving, decrease in size, and silencing of a radial-direction gap type magnet motor which has a power of approximately 50 W or less and is widely used as various driving sources for an electric home appliance, an air-conditioning device, an information device, and the like.

DESCRIPTION OF REFERENCE SIGNS $\phi t$: MECHANICAL ANGLE OF STATOR IRON CORE TEETH
$\phi p$: MECHANIC ANGLE OF MAGNETIC POLE
Ms: STATIC MAGNETIC FIELD
M: MAGNETIZATION VECTOR
$M\theta$: ANGLE OF MAGNETIZATION VECTOR
Hex: EXTERNAL MAGNETIC FIELD
$H\theta$: DIRECTION OF EXTERNAL MAGNETIC FIELD

PREFERRED EMBODIMENTS FOR CARRYING OUT THE INVENTION

A radial-direction gap type magnet motor according to the invention includes a magnetic anisotropic magnetic pole in which assuming that $\phi t$ denotes a mechanic angle of a stator iron core teeth of the radial-direction gap type magnet motor, $\phi p$ denotes a mechanical angle of a magnetic pole, and $M\theta$ denotes an angle of a magnetization vector M with respect to a circumferential tangential line of the magnetic pole, $M\theta$ of a mechanical angle region $\phi p = \phi t$ of a magnetic pole center region facing $\phi t$ is set to be 75 to 90° and more desirably 90° so as to have an average error within 5°, and $M\theta/\phi p \leq 7$ is satisfied in the region of $\phi p \times 0.1°$ at a position of a circumferential magnetic pole end, that is, a position between different poles.

In the magnetic anisotropic magnetic pole described above, first, as shown in FIG. 1A, the deformed magnetic pole is prepared at the magnetic pole end to have a part given similar to an in-plane anisotropy by mechanical application. In addition, the magnetic pole is changed to a circular arc magnetic pole having the patterns shown in FIGS. 1A, 1B, 1C, 1D, and 1E. Accordingly, it is possible to adjust the magnetic pole satisfying the linear approximation in which a correlation coefficient of $M\theta$ and $\phi p$ is 0.99 or more and $M\theta/\phi p$ is 7 or less. Here, FIGS. 1A to 1E show the right half sectional shape from the center of the magnetic pole, where $H\theta$ of FIG. 1A indicates an angle formed between a homogeneous external magnetic field Hex and inner and outer peripheral sections of the anisotropic magnetic pole at an arbitrary position. The $H\theta$ corresponds to a magnetic anisotropic direction with respect to the tangential line at an arbitrary magnetic pole surface of FIG. 1E, that is, the magnetization vector angle $M\theta$ with respect to the circumferential tangential line of the magnetic pole.

Figure 1A:
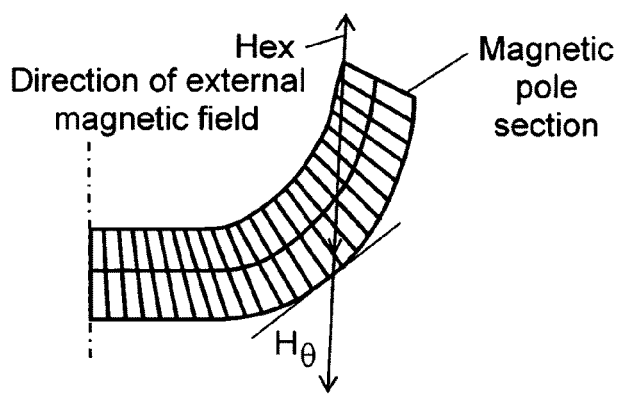
FIG. 1A is a first conceptual diagram showing an anisotropic direction control of a magnetic pole.
Figure 1B:
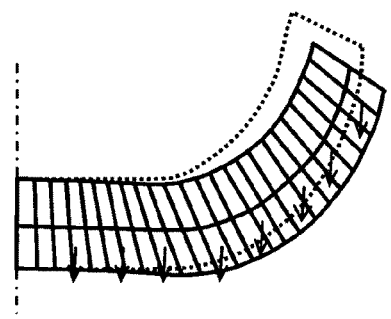
FIG. 1B is a second conceptual diagram showing the anisotropic direction control of the magnetic pole.
Figure 1C:
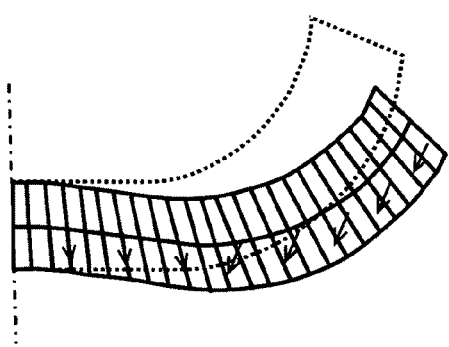
FIG. 1C is a third conceptual diagram showing the anisotropic direction control of the magnetic pole.
Figure 1D:
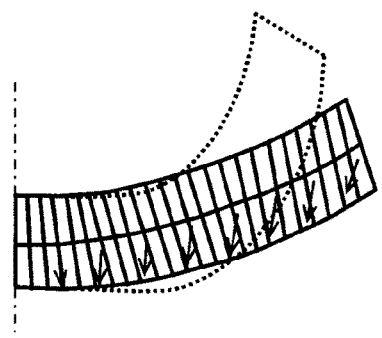
FIG. 1D is a fourth conceptual diagram showing the anisotropic direction control of the magnetic pole.
Figure 1E:
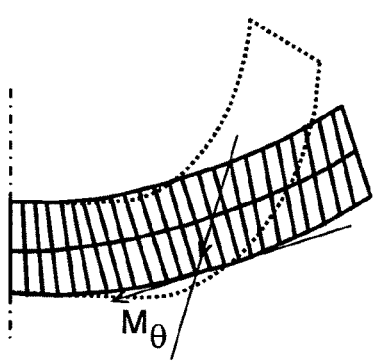
FIG. 1E is a fifth conceptual diagram showing the anisotropic direction control of the magnetic pole.
Figure 1F:
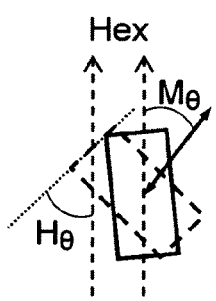
FIG. 1F is an enlarged diagram of a main part showing the anisotropic direction control of the magnetic pole.

FIG. 1F is an enlarged view showing the main part of the anisotropic direction control of the magnetic pole.

Figure 2A:
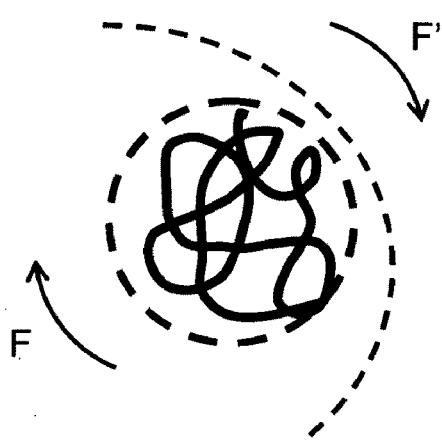
FIG. 2A is a first conceptual diagram showing a flow state of a molten polymer due to an external force.
Figure 2B:
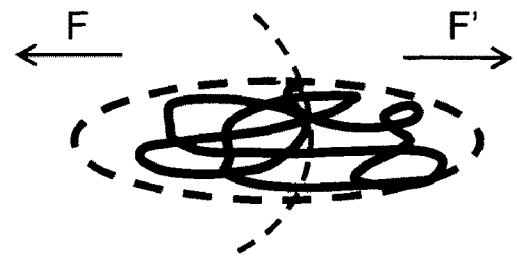
FIG. 2B is a second conceptual diagram showing the flow state of the molten polymer due to the external force.
Figure 3:
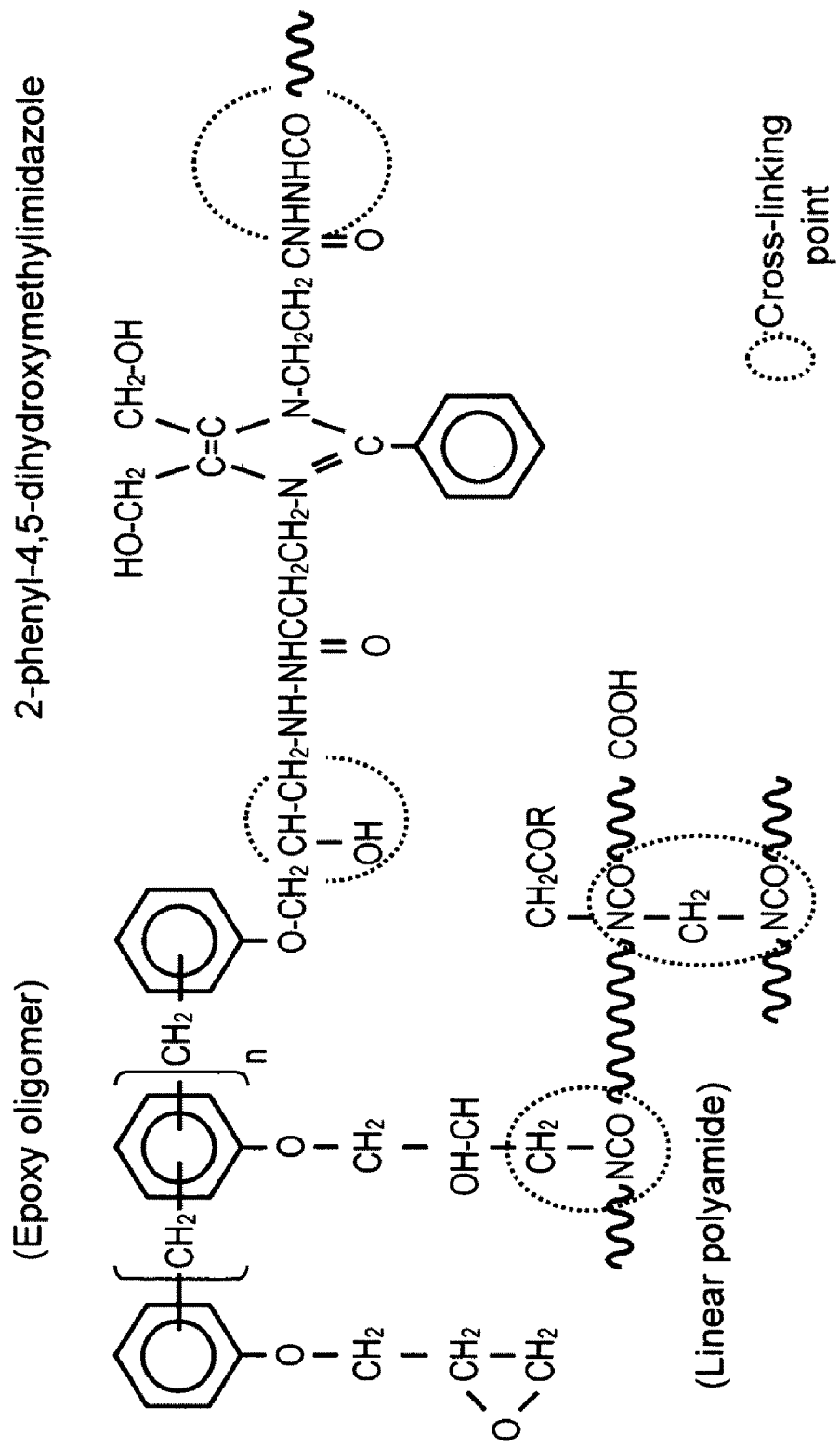
FIG. 3 is a schematic diagram showing the molecular structure of a thermosetting resin composite which gives a plastic workability to a magnetic pole.

As described above, in the present invention, as seen from at least FIG. 1A to FIG. 1E, a thermosetting resin composite which has been adjusted to give a plastic workability to the magnetic pole is an essential component as well as the magnetic anisotropic rare-earth magnetic materials. Note that, as shown in the conceptual diagrams of FIGS. 2A and 2B, the plastic workability described herein is obtained by the rheology, interposed in the magnetic pole as a string-shaped molecular chain in which a part of a component of the thermosetting resin composite is meshed, with the principle of a viscous deformation such as a shear flow action or an extension flow action occurs in accordance with a heat and an external force F-F'. In addition, regarding the circular arc magnetic pole obtained after the deformation of FIG. 1E, for example, the component of the thermosetting resin composite shown in FIG. 3 is allowed to have a three-dimensional mesh structure by means of a cross-linking reaction. Accordingly, it is possible to improve the heat-resisting property and the durability of the magnetic pole.

FIG. 3 shows the thermosetting resin composite which is adjusted by novolac-type epoxy oligomer, liner polyamide, and 2-phenyl-4,5-dihydroxymethylimidazole, which is an example of the thermosetting resin composite adjusted to give the plastic workability to the magnetic pole according to the invention. The example of FIG. 3 shows the string-shaped molecular chain which is meshed when the linear polyamide is in a molten state, and the string-shaped molecular chain is homogenously interposed in a matrix of the magnetic pole and generates the shear flow action or the extension flow action in accordance with the external force F-F' so as to deform the magnetic pole. In addition, the thermosetting resin composite generating the flow action shown in FIGS. 2A and 2B is not limited to the example shown in FIG. 3.

Incidentally, a torque density of the radial-direction gap type magnet motor is proportional to the static magnetic field Ms which is generated by the magnetic pole, that is, a gap magnetic flux density between the stator iron core and the magnetic pole. In consideration of the fact that the gap magnetic flux density of the radial-direction gap type magnet motor formed by the magnetic pole having the same dimension and structure and the stator iron core is substantially proportional to the square root of the ratio of the energy density (BH) max of the magnetic pole, if the value of the energy density (BH) max of the magnetic pole according to the invention is set to be 150 kJ/m$^3$ or more compared with an isotropic Nd$_2$Fe$_{14}$B bond magnet having the upper limit of the level of the energy density (BH) max of approximately 80 kJ/m$^3$ it is expected that the torque density increases by 1.36 times. Accordingly, from the viewpoint of the increase in torque density, desirably, the magnetic anisotropic magnet forming the magnetic pole according to the invention has the magnetic performance of the residual magnetization Mr≧0.95 T, the intrinsic magnetic coercive force HcJ≧0.9 MA/m, and the energy density (BH) max≧150 kJ/m$^3$.

In order to obtain the magnetic anisotropic magnetic pole having the energy density (BH) max≧150 kJ/m$^3$, desirably, the volume ratio of the rare-earth magnet material having the energy density (BH) max≧270 kJm$^3$ in the magnetic pole is 80 vol. % or more and the homogeneous external magnetic field Hθ magnetizing the magnetic pole is 2.4 MA/m or more.

As the magnetic anisotropic rare-earth magnet material according to the invention, 1-5-type SmCo-based rare-earth magnet fine powder of a single magnetic-domain particle type and 2-17 type SmCo-based rare-earth magnetic particle of a 2-phase separation can be partly or entirely used. However, from the viewpoint of the resource balance, it is desirable to use a rare-earth-iron-based rare-earth magnet material. Examples are RD (Reduction and Diffusion)-Sm$_2$Fe$_{17}$N$_3$ rare-earth magnet fine powder which is proposed by A. Kawamoto et al. (see "SmFeN magnet powder prepared by reduction and diffusion method" written by A. Kawamoto, T. Ishikawa, S. Yasuda, K. Takeya, K. Ishizaka, T. Iseki, and K. Ohmori, IEEE Trans. Magn., 35, 1999, p. 3322) or so-called HDDR-Nd$_2$Fe$_{14}$B-based rare-earth magnet particle which is proposed by T. Takeshita et al. and is formed by subjecting the phase of rare-earth-iron-based alloy (R2[Fe, Co]14B) to hydrogenation (R2[Fe, Co]14BHx), the phase decomposition (RH$_2$+Fe+Fe$_2$B), desorpsion, and recombination in the range of 650 to 1000° C. (see "Magnetic properties and microstructure of the Nd—Fe—B magnet powders produced by hydrogen treatment" written by T. Takeshita and R. Nakayama, Proc. 10$^{th}$ Int. Workshop on Rare-earth Magnets and Their Applications, 1989, pp. 551-562).

Example

Hereinafter, an example of the magnetic anisotropic magnetic pole according to the invention and the radial-direction gap type magnet motor having 8 poles and 12 slots will be described in more detail. However, the invention is not limited to this example.

Figure 4:
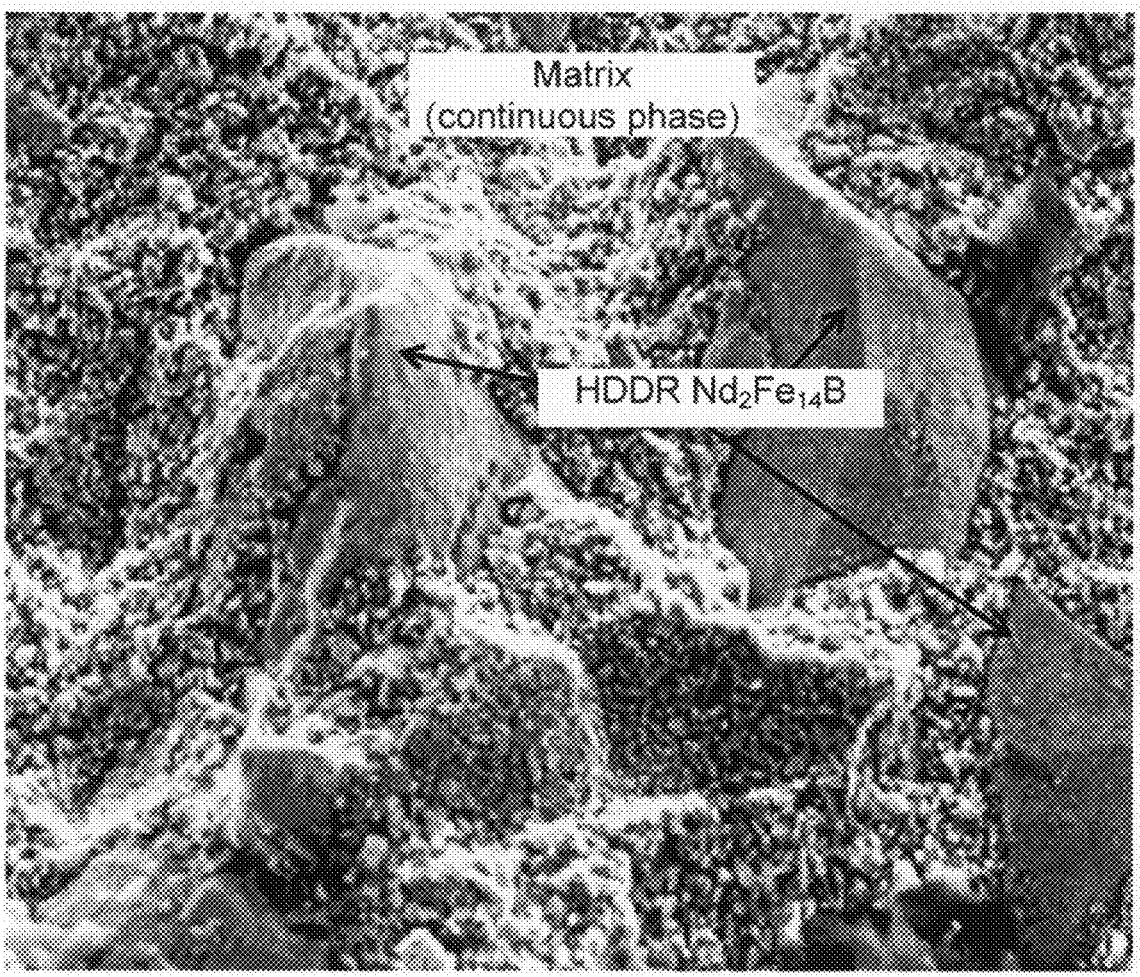
FIG. 4 is a diagram showing an electron micrograph in which the macro structure of an anisotropic magnetic pole is shown.

First, FIG. 4 is a scanning electron micrograph showing the macro structure of a deformed magnetic pole having a density of 6.01 Mg/m$^3$ according to the invention. Here, the anisotropic Sm$_2$Fe$_{17}$N$_3$-based rare-earth magnet fine powder having the particle diameter of 3 to 5 μm and the energy density (BH) max of 290 kJ/m$^3$, and the anisotropic Nd$_2$Fe$_{14}$B-based rare-earth magnetic particle having the particle diameter of 38 to 150 μm and the energy density (BH) max of 270 kJ/m$^3$ are the magnetic anisotropic deformed magnets which are obtained by applying an orientation magnetic field of the homogeneous external magnetic field Hθ of 1.4 MA/m together with a thermosetting resin composite at 160° C., and press-forming by the pressure of 20 to 50 MPa. The energy density (BH) max is 155 kJ/m$^3$ due to the magnetization using the homogeneous external magnetic field Hθ of 2.4 MA/m. The macro structure of the magnetic pole is characterized with the Nd$_2$Fe$_{14}$B-based rare-earth magnet particles that are isolated by a matrix (continuous phase) formed of the Sm$_2$Fe$_{17}$N$_3$-based rare-earth magnet fine powder and the thermosetting resin composite. In addition, the volume ratio of the Sm$_2$Fe$_{17}$N$_3$-based rare-earth magnet material and Nd$_2$Fe$_{14}$B-based rare-earth magnet material is 81 vol. %.

Meanwhile, the thermosetting resin composite is formed of the novolac-type epoxy oligomer having an epoxy equivalent amount of 205 to 220 g/eq and a melting point of 70 to 76° C., linear polyamide having a melting point of 80° C. and a molecular weight of 4,000 to 12,000, and 2-phenyl-4,5-dihydroxymethylimidazole. Since the above materials do not gelate, the linear polyamide melts again by the heat so as to be interposed in the magnetic pole in the form of the meshed string-shaped molecular chain, and causes the shear flow action and the extension flow action in accordance with the direction of the heat and the external force shown in FIG. 2B. Accordingly, the viscous deformation is exhibited as shown in FIGS. 1A, 1B, 1C, 1D, and 1E.

Figure 5:
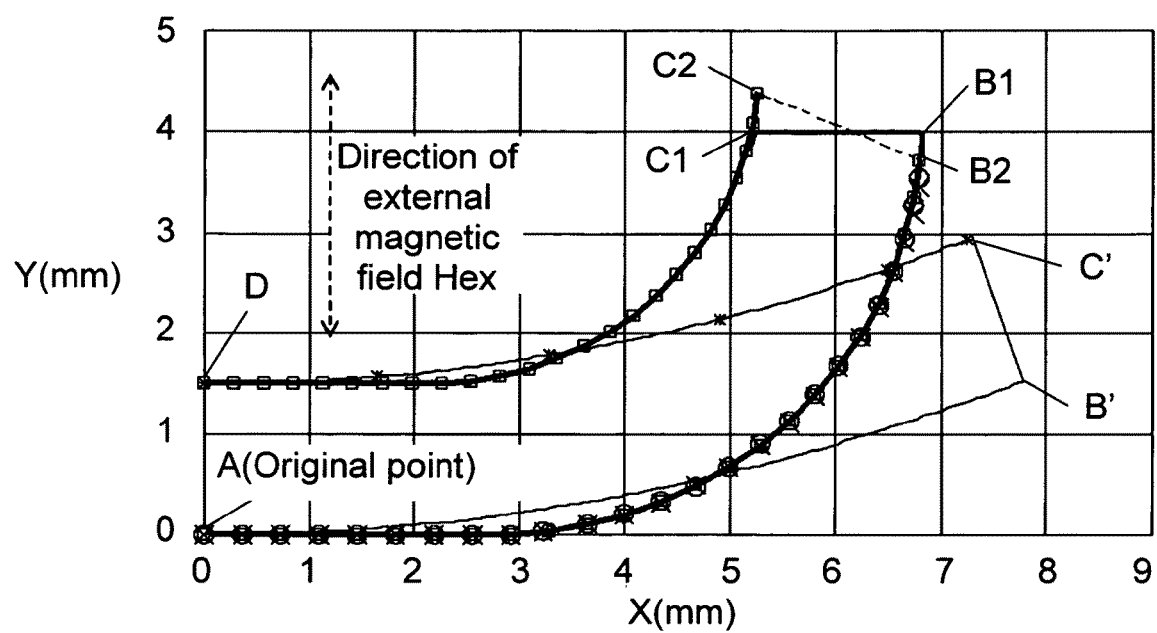
FIG. 5 is a diagram showing the anisotropic direction control of a magnetic pole in the form of a coordinate value.

FIG. 5 is a diagram showing two types of magnetic anisotropic deformed magnetic poles having the above-described macro structure according to the invention and the circular arc magnetic anisotropic magnetic pole obtained by the deformation thereof, that is, the magnetic poles before and after the deformation represented by coordinate values. Here, the original point A of FIG. 5 is a circumferential center of the outer peripheral surface, and indicates ½ of the magnetic pole section in FIG. 5.

In addition, the deformed magnetic pole indicated by the coordinate A-B1-C1-D is Example 1, and the deformed magnetic pole indicated by the coordinate A-B2-C2-D is Example 2. The circular arc magnetic pole indicated by the coordinate A-B'-C'-D is the shape of the magnetic pole after the deformation. The actual deformation process is carried out by inserting a deformed magnetic pole into a cavity having the coordinate A-B'-C'-D under the condition of 135° C. in an atmospheric state and 1 MPa without a pressurization maintaining time.

Here, as shown in FIG. 5, the angle Hθ formed between the homogeneous external magnetic field Hex and the tangential line at an arbitrary position of the deformed magnetic pole corresponds to the angle Mθ formed between the magnetization vector M and the tangential line of the inner and outer peripheries of the circular arc magnetic pole. That is, Hθ/φP≈Mθ/φP.

In this example, assuming that the mechanic angle φt of the stator iron core teeth is 14°, the mechanic angle φp of the magnetic pole is 45°, and the magnetization vector angle with respect to the circumferential tangential line of the magnetic pole is Mθ, in order to obtain the precision satisfying the linear approximation in which Mθ in the region (14° of the mechanic angle φp=φt of the magnetic pole facing φt is 90°, Mθ/φp≦7 is satisfied in the region of the magnetic pole end φp×0.1° (both ends of the magnetic pole are 4.5°), and the correlation coefficient of Mθ and φp is 0.99 or more, the angle Hθ formed between the external magnetic field Hex and the tangential line of the inner and outer peripheries of the netic pole to the outer peripheral surface of the laminated magnetic steel sheet having the outer diameter of 37.9 mm is considered, it is possible to allow 90% or more of errors with respect to the set angle to be within 5°.

TABLE 1

| | Magnetic pole | | | | | | | |
|---|---|---|---|---|---|---|---|---|
| | N-pole 1 | S-pole 1 | N-pole 2 | S-pole 2 | N-pole 3 | S-pole 3 | N-pole 4 | S-pole 4 |
| Average error in region of 90° | 3.73 | 2.41 | 1.22 | 0.92 | 1.16 | 2.04 | 3.80 | 2.02 |
| Between different poles | S-pole 4 and N-pole 1 | N-pole 1 and S-pole 1 | S-pole 1 and N-pole 2 | N-pole 2 and S-pole 2 | S-pole 2 and N-pole 3 | N-pole 3 and S-pole 3 | S-pole 3 and N-pole 4 | N-pole 4 and S-pole 4 |
| Correlation coefficient of regression line | 0.9974 | 0.9983 | 0.998 | 0.9973 | 0.9963 | 0.9966 | 0.9965 | 0.9969 | deformed magnetic pole section is set to be 0.3655 mm pitch at the outer periphery A-B1(B2) of the deformed magnet and 0.2845 mm pitch at the inner periphery C1(C2)-D. Totally, ninety six rigid bodies are assembled which are divided into two at the center of the magnetic pole in a radial direction. The shape of the deformed magnetic pole is set on the basis of the nonlinear structure analysis of the rotational movement of each rigid body.

Next, the circular arc magnetic pole obtained after the deformation according to the invention is subjected to the heat treatment under the condition of 170° C. and 20 minutes in an atmospheric state so as to generate the cross-linking reaction shown in FIG. 3 of the thermosetting resin composite containing the linear polyamide. Although FIG. 3 shows a free epoxy group, it is desirable that the free epoxy group reacts with imidazole derivatives, amino active hydrogen of linear polyamide, or terminated carboxyl group.

The obtained circular arc magnetic pole (2 g) according to the invention has the outer radius of 20.45 mm, the inner radius of 18.95 mm, and the thickness of 1.5 mm, and is magnetized by the homogeneous external magnetic field Hθ of 2.4 MA/m by means of a solenoid coil and a pulse magnetization power source. Subsequently, the magnetic pole is bonded and fixed to the outer peripheral surface of a laminated magnetic steel sheet having the outer diameter of 37.9 mm, thereby obtaining an 8-pole magnet rotor having the axial length of 14.5 mm, and the diameter of 40.9 mm according to Examples 1 and 2 of the invention.

Table 1 shows an average error of the magnetization vector angle Mθ in the set region of 90° of the magnet rotor and a correlation coefficient of the regression line of the magnetization vector angle Mθ with respect to the mechanic angle φp of the magnetic pole between different poles. However, the measurement of the magnetization vector angle Mθ was carried out by obtaining the measurement result of 24 points of Mθ per φp 1° by means of a vector teslameter provided with a three-dimensional hall probe. As understood from Table 1, when Mθ in the region (14°) of the mechanic angle φp=φt of the magnetic pole facing φt is set to 90°, the precision is obtained such that the average error is within 5° and the linear approximation having the correlation coefficient of 0.99 or more between Mθ and φp is satisfied in the region of the magnetic pole end φp×0.1° (both ends of the magnetic pole are 4.5°).

In addition, Table 2 shows a frequency and an accumulation % of the error of the magnetization vector angle Mθ in the region of φp=360°, that is, the whole circumference of the 8-pole magnet rotor. As understood from Table 2, even when the assembling precision upon bonding and fixing the mag-

TABLE 2

| Angle error | Frequency | Accumulation % |
|---|---|---|
| 0 | 0 | 0.000 |
| 1 | 2391 | 0.266 |
| 2 | 2077 | 0.496 |
| 3 | 2093 | 0.729 |
| 4 | 1173 | 0.859 |
| 5 | 701 | 0.937 |
| 6 | 357 | 0.977 |
| 7 | 131 | 0.991 |
| 8 | 49 | 0.997 |
| 9 | 15 | 0.999 |
| 10 | 7 | 0.999 |
| 11 | 5 | 1.000 |

Table 3 shows an analysis result of an anisotropic angle and the degree of a cylindrical magnet having the diameter of 1 mm extracted from a position corresponding to the set value of Mθ with respect to the mechanic angle φp in the deformed magnetic pole and the circular arc magnetic pole. First, when a center position of the cylindrical magnet is set to Mθ set angle at φp, the angle at which the residual magnetization Ms becomes maximum in all the directions of the cylindrical sample, that is, Hθ and Mθ with respect to φp are obtained. Meanwhile, the anisotropic degree is evaluated by means of an anisotropic dispersion σ. Here, the anisotropic dispersion σ, that is, the analysis of the distribution of the magnetization easy axis (C-axis) is as below. In the solution for obtaining the minimum total energy E of the cylindrical magnet in a rotation-magnetization total energy $E=Ku \cdot \sin^2\phi - Ms \cdot H \cdot \cos(\phi-\phi 0)$, that is, $(\delta E/\delta\phi)=Ku \cdot \sin^2\phi - Ms \cdot H \cdot \sin(\phi-\phi 0)=0$, first, $\phi$ is determined. In $M=Ms \cdot \cos(\phi 0-\phi)$, the M-H loop for obtaining the maximum M is measured by a sample vibrating magnetometer (VSM). Then, in $Ku \cdot \sin^2\phi - Ms \cdot H \cdot \sin(\phi o-\phi)=0$, $\phi$ is obtained, and the overall orientation state, that is, the anisotropic distribution σ is obtained by means of the probability distribution of φ. However, φ0 indicates the angle of the external magnetic field, φ indicates the rotary angle of Ms, Ms indicates the spontaneous magnetic moment, Ku indicates the magnetic anisotropic constant, and E indicates the total energy. As a result, when the center position of the cylindrical magnet is set to be the set angle Mθ, the angle at which the residual magnetization Ms becomes maximum in all directions of the cylindrical sample, that is, Hθ and Mθ with respect to φp are substantially equal to the set value Mθ. Also, the maximum anisotropic distribution a of the deformed magnet and the circular arc magnet is 0.5 at a maximum, and this level is equivalent if the measurement error is considered. This result verifies that only the anisotropic direction changes without the deterioration of the anisotropy degree, that is, the energy density (BH) max when the respective parts of the magnet rotationally move during the time when the deformed magnet is changed to the circular arc magnet.

TABLE 3

| | Mθ setting value (deg) | | |
|---|---|---|---|
| | 90 | 40 | 10 |
| Hθ (deg) anisotropic | 90 | 39.6 | 10.5 |
| dispersion σ | 12.35 | 12.9 | 15.68 |
| Mθ (deg) anisotropic | 89.5 | 41.2 | 9.5 |
| dispersion σ | 12.85 | 13.3 | 15.41 |

Next, the 8-pole-12-slot radial-direction gap type magnet motor is obtained from the above-described 8-pole magnet rotor and the stator iron core having the teeth mechanic angle φt=14°.

In addition, the 8-pole magnet rotor having the diameter of 40.9 mm and the axial length of 14.5 mm is conventional Example 1, the 8-pole magnet rotor being manufactured from the circular arc magnetic anisotropic magnetic pole having the outer radius of 20.45 mm, the inner radius of 18.95 mm, and the thickness of 1.5 mm in the space of the homogeneous external magnetic field Hex.

Figure 6A:
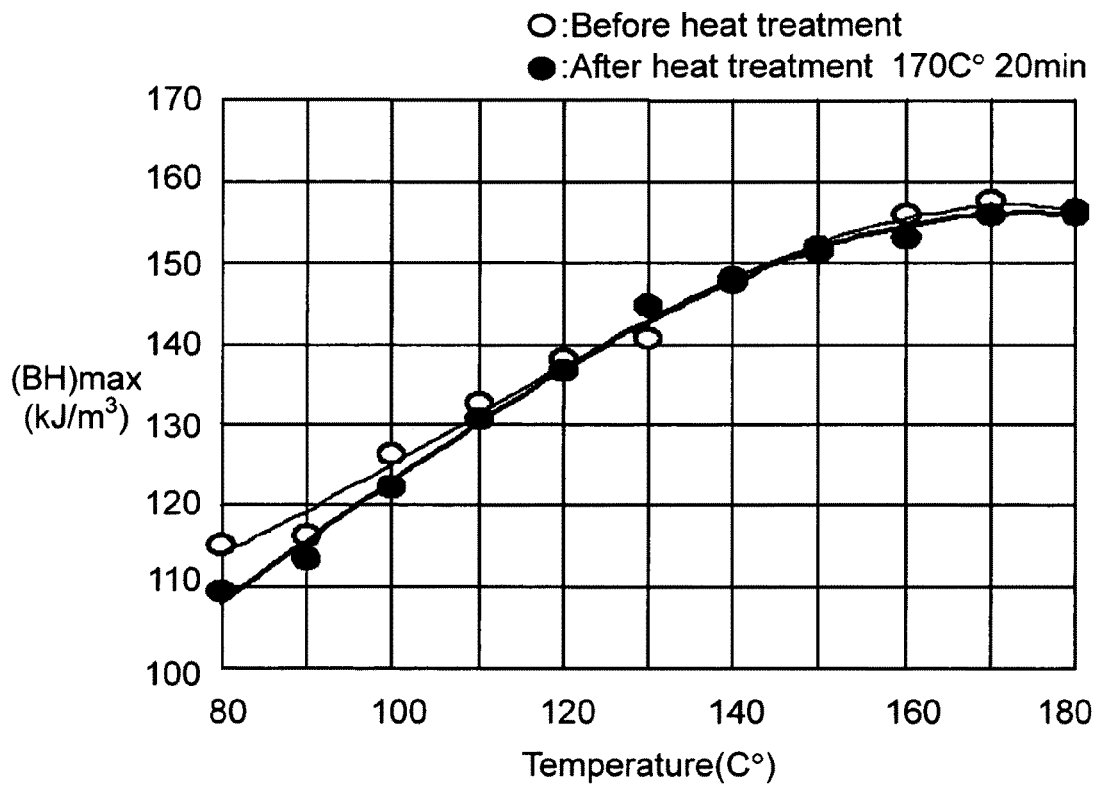
FIG. 6A is a characteristic diagram showing an energy density and a formation temperature of a magnetic pole.
Figure 6B:
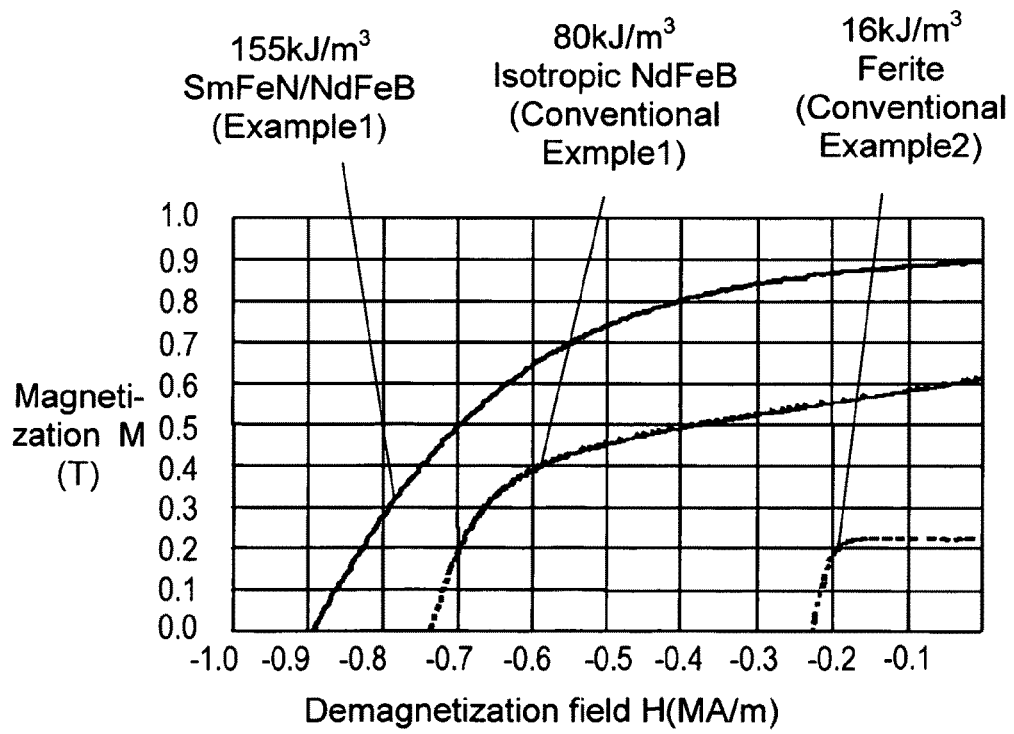
FIG. 6B is a characteristic diagram showing a comparison of a demagnetization curve.

Incidentally, FIGS. 6A and 6B are characteristic diagrams showing the energy density (BH) max of the magnetic anisotropic magnetic pole according to the invention having been subjected to the pulse magnetization of 2.4 MA/m, where the volume ratio of the rare-earth magnet material contained in the magnetic pole is 81 vol. %.

First, FIG. 6A is a characteristic diagram showing a relationship between the energy density (BH) max and the formation temperature of the deformed magnetic pole. In this example, the energy density (BH) max exceeds 150 kJ/m³ at the formation temperature of 150° C. or more. In addition, even when a high-temperature exposure is carried out under the condition of 170° C. and 20 minutes in an atmospheric state in order to generate the cross-linking reaction of the thermosetting resin composite containing the linear polyamide which is contained in the magnetic pole obtained after the deformation as shown in FIG. 3, it is understood that for example, "≧150 kJ/m³" is maintained without changing the structure of the surface of the rare-earth magnet material due to the oxidization reaction occurring in the residual gap of the magnetic pole.

Next, FIG. 6B is a characteristic diagram comparing the demagnetization curve of the magnetic pole of 155 kJ/m³, which was formed at the temperature of 160° C. and then subjected to the heat treatment at 170° C. for 20 minutes, with the isotropic magnet of 80 kJ/m³ and the polar anisotropy magnet of 16 kJ/m³ (the magnetization pattern is the same as that of the isotropic magnet subjected to the sine-wave magnetization as shown in FIG. 4).

The isotropic magnet (16 g) of 80 kJ/m³ has a ring shape and was bonded and fixed, as similarly to Example of the invention, to the outer peripheral surface of the laminated magnetic steel sheet having the outer diameter of 37.9 mm so as to have the diameter of 40.9 mm and the axial length of 14.5 mm, and was subjected to the sine-wave magnetization using the magnetization yoke and the pulse magnetization power source, thereby obtaining a sine wave-magnetized 8-pole magnet rotor. In addition, the rotor was mounted to an 8-pole-12-slot radial-direction gap type magnet motor (this is conventional Example 2).

In addition, a polar anisotropy magnet (83 g) of 16 kJ/m³ was formed to have the diameter of 50.3 mm and the axial length of 25 mm, and then subjected to the sine-wave magnetization using the magnetization yoke and the pulse magnetization power source, thereby obtaining a sine wave-magnetized 8-pole magnet rotor. In addition, the rotor was mounted to an 8-pole-12-slot radial-direction gap type magnet motor (this is conventional Example 3).

Figure 7:
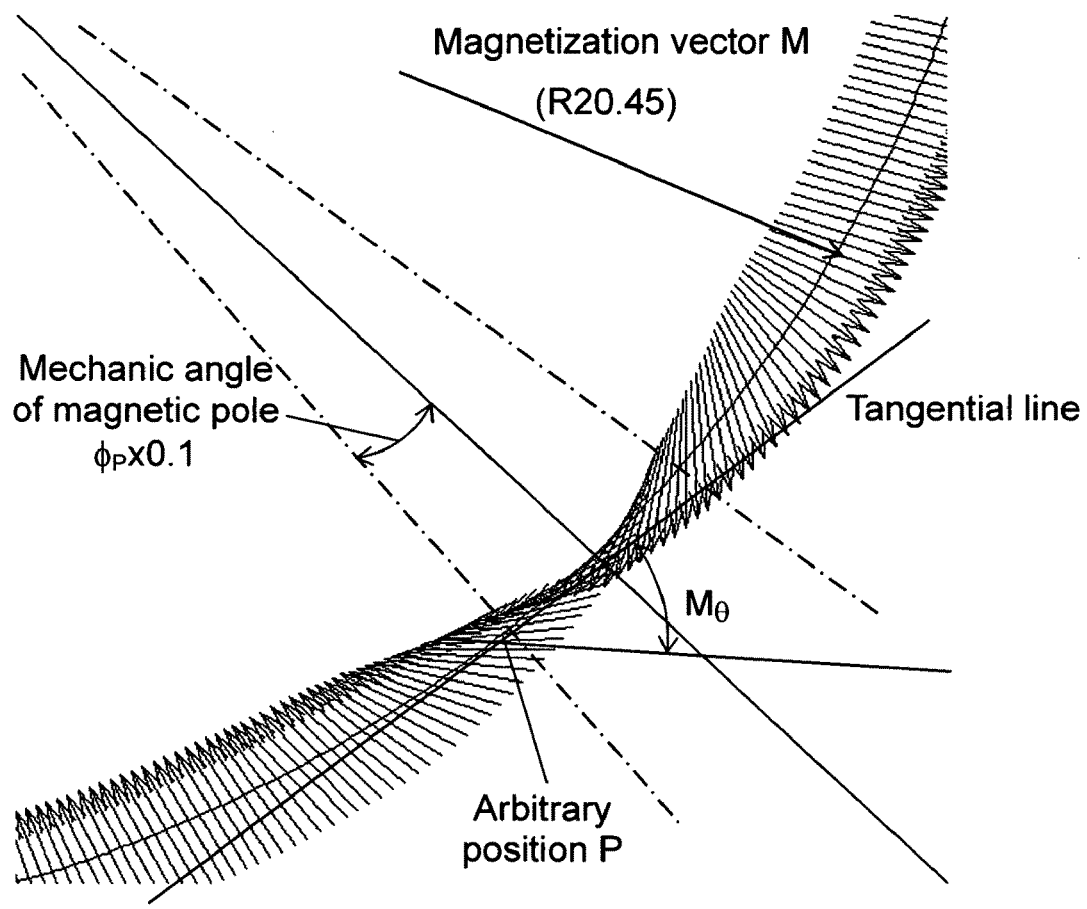
FIG. 7 is a characteristic diagram showing a relationship between a direction of a static magnetic field Ms and a mechanic angle $\phi p$ of a magnetic pole.

FIG. 7 is a characteristic diagram showing the magnetization vector M indicated by the arrow in the circumference based on the magnetic pole center in a radial direction of the 8-pole magnet rotor according to Example 1, manufactured from the magnetic anisotropic magnetic pole having the energy density (BH) max of 155 kJ/m³ according to the invention. Here, the mechanic angle φP of the magnetic pole is 45°, and the magnetization vector M is 0.5° pitch.

The magnetic anisotropic magnetic pole according to the invention is magnetized by the homogeneous external magnetic field Hex of 2.4 MA/m using a solenoid coil in a radial direction. Note that, during the magnetization by use of 2.4 MA/m and 4 MA/m, the residual magnetization Mr of the magnetic pole was 0.95 T and the magnetic coercive force HcJ was 0.9 MA/m in the both cases. Accordingly, it can be said that the magnetic pole was completely magnetized by at least the magnetization field Hm of 2.4 MA/m. In such magnetic anisotropic magnetic pole according to the invention, even when a deviation occurs from the direction of the magnetization magnetic field Hm to the anisotropic direction (magnetization easy axis), the magnetization occurs along the anisotropic direction, and accordingly, the direction of the magnetization vector M of FIG. 7 indicates the magnetic anisotropic direction. Assuming that Mθ denotes a magnetization vector angle, Mθ/φp indicates the magnetic anisotropic angle distribution with respect to the mechanic angle φp of the magnetic pole.

The 8-pole magnet rotor according to Example 1 satisfies Mθ=75 to 90° in the region of the magnetic pole center (φp=φt). Accordingly, when the regression analysis is carried out between the mechanic angle φp and the angle Mθ of the magnetization vector M with respect to the circumferential tangential line of the magnetic pole center in a radial direction in the region of the mechanic angle φp(45°)×0.1° of the magnetic pole, it is found that a first degree function, such as Mθ=−6.4575φp+289.76, stands, and the correlation coefficient is 0.9975. Here, the slope Mθ/φp of the line indicates a degree of the changed direction of the magnetization vector Mθ with respect to the mechanic angle φp between magnetic poles having different polarities, that is, the magnetic anisotropic angle change with respect to the mechanic angle φp of the magnetic pole. In other words, this result shows that a continuous control is carried out instead of a discontinuous direction control of the magnetic anisotropy disclosed in Non-patent Document 5 of FIG. 2B.

Figure 8A:
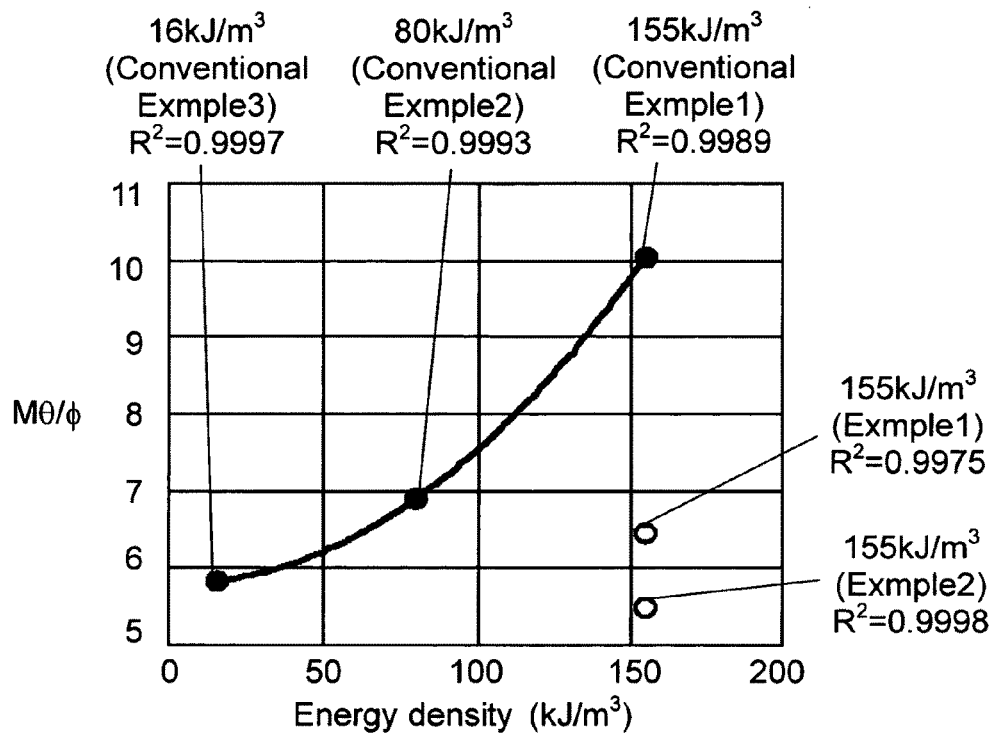
FIG. 8A is a characteristic diagram showing $M\theta/\phi p$ and an energy density (BH) max.

FIG. 8A is a plotted characteristic diagram showing Mθ/φp of respective Examples 1 and 2 and conventional Examples 1 to 3 in the region of the mechanic angle φp (45°)×0.1° of the magnetic pole, plotted with respect to energy density of the respective magnetic poles. However, R² of FIG. 8A indicates the correlation coefficient of Mθ/φp in each regression analysis. In addition, FIG. 8B is a characteristic diagram showing a relationship between Mθ/φp and the cogging torque of the radial-direction gap type magnet motor.

First, in FIG. 8A, in the region of the mechanic angle φp (45°)×0.1° of the magnetic pole, it is necessary to note the direction change degree Mθ/φp of the static magnetic field Ms with respect to the mechanic angle φp between magnetic poles having different polarities. In conventional Examples, Mθ/φp tends to increase in an exponential manner due to the increase in energy density (BH) max. However, due to the continuous direction control of the magnetic anisotropy, $M\theta/\phi p$ of the magnetic anisotropic magnetic pole according to the invention is equal to or lower than that of conventional Example 2 (80 kJ/m³) or conventional Example 3 (16 kJ/m³).

Figure 8B:
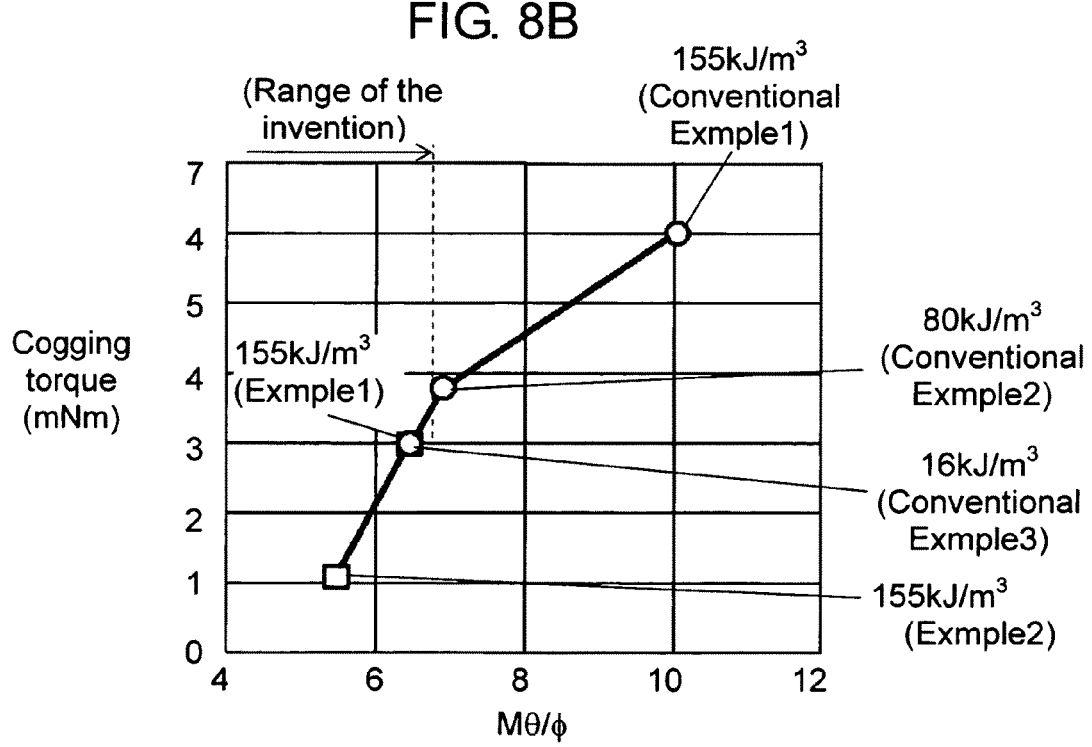
FIG. 8B is a characteristic diagram showing a relationship between a cogging torque and $M\theta/\phi p$.
Figure 9A:
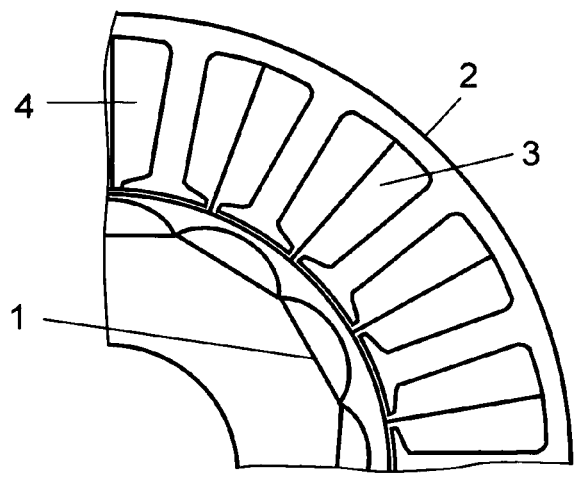
FIG. 9A is a first conceptual diagram showing a cogging torque reduction method by means of a magnetic pole shape.
Figure 9B:
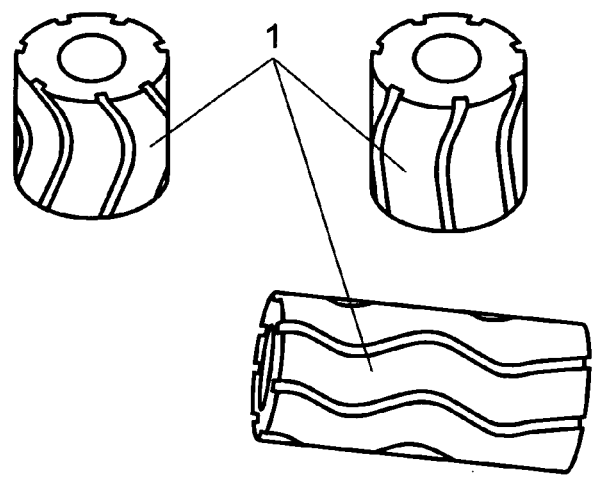
FIG. 9B is a second conceptual diagram showing the cogging torque reduction method by means of the magnetic pole shape.
Figure 9C:
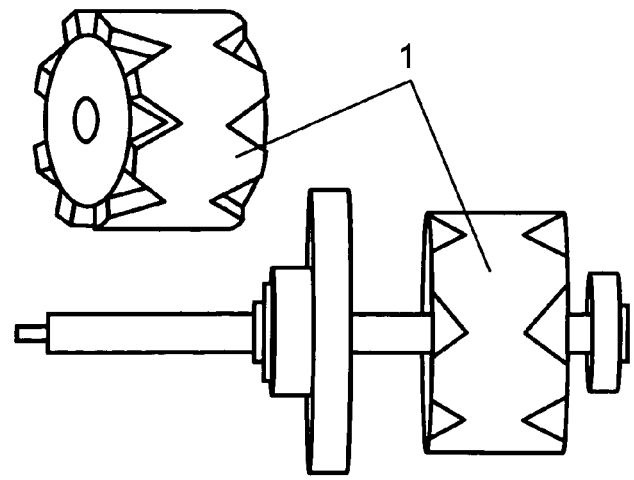
FIG. 9C is a third conceptual diagram showing the cogging torque reduction method by means of the magnetic pole shape.
Figure 10A:
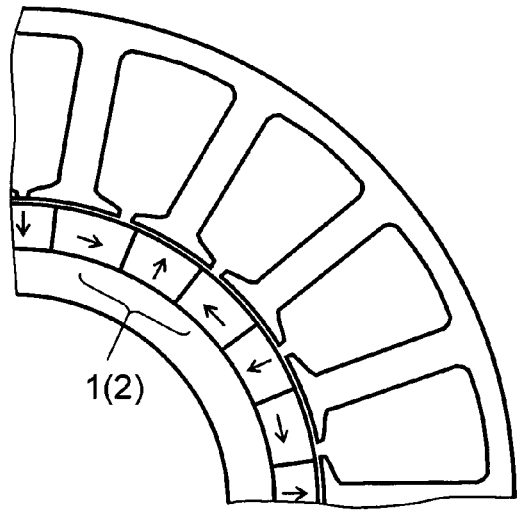
FIG. 10A is a first conceptual diagram showing a cogging torque reduction method by means of a discontinuous control of a magnetization direction.
Figure 10B:
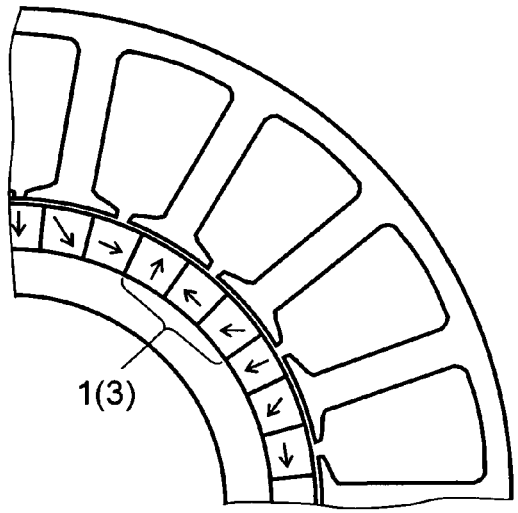
FIG. 10B is a second conceptual diagram showing the cogging torque reduction method by means of the discontinuous control of the magnetization direction.
Figure 10C:
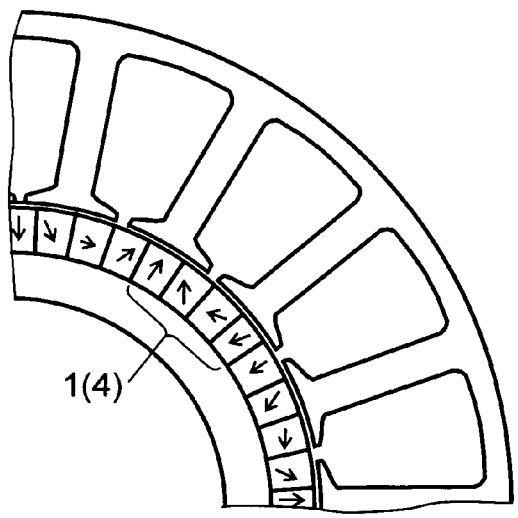
FIG. 10C is a third conceptual diagram showing the cogging torque reduction method by means of the discontinuous control of the magnetization direction.
Figure 10D:
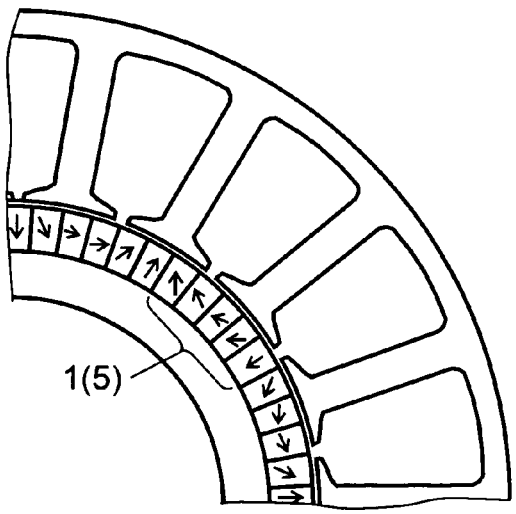
FIG. 10D is a fourth conceptual diagram showing the cogging torque reduction method by means of the discontinuous control of the magnetization direction.
Figure 11:
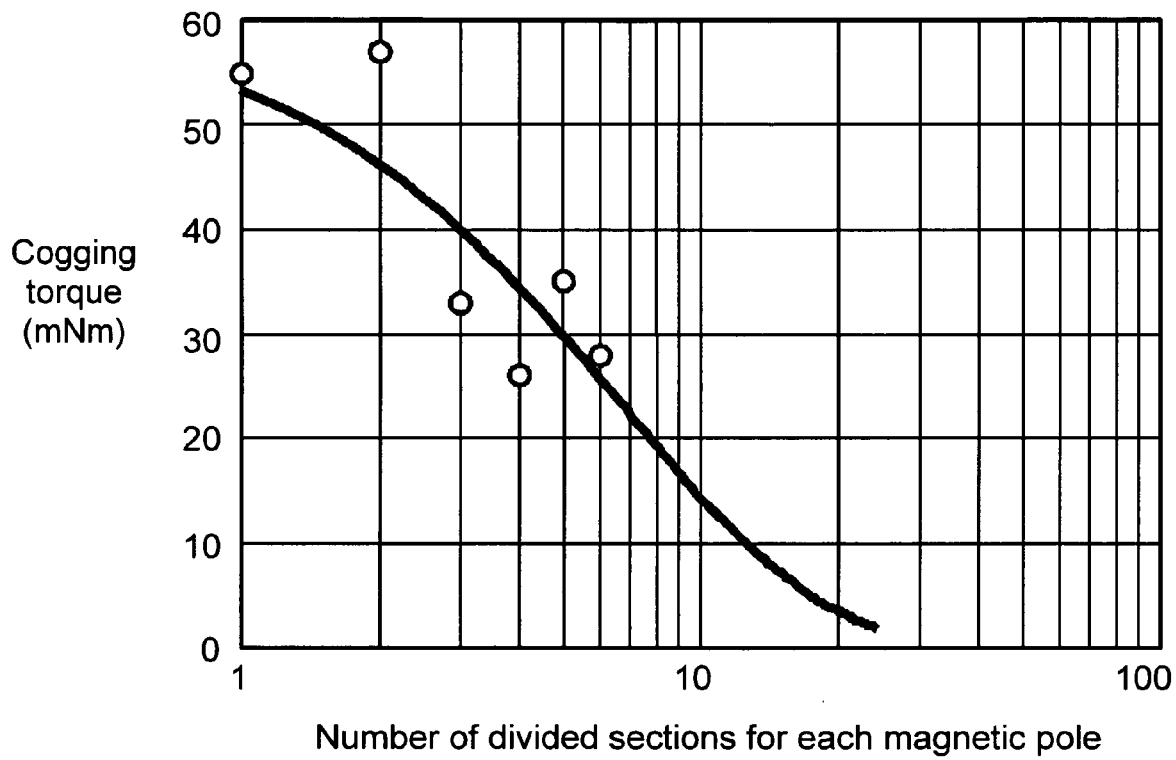
FIG. 11 is a characteristic diagram showing a relationship between a cogging torque and the number of magnetic pole sections having different magnetization directions.
Figure 12:
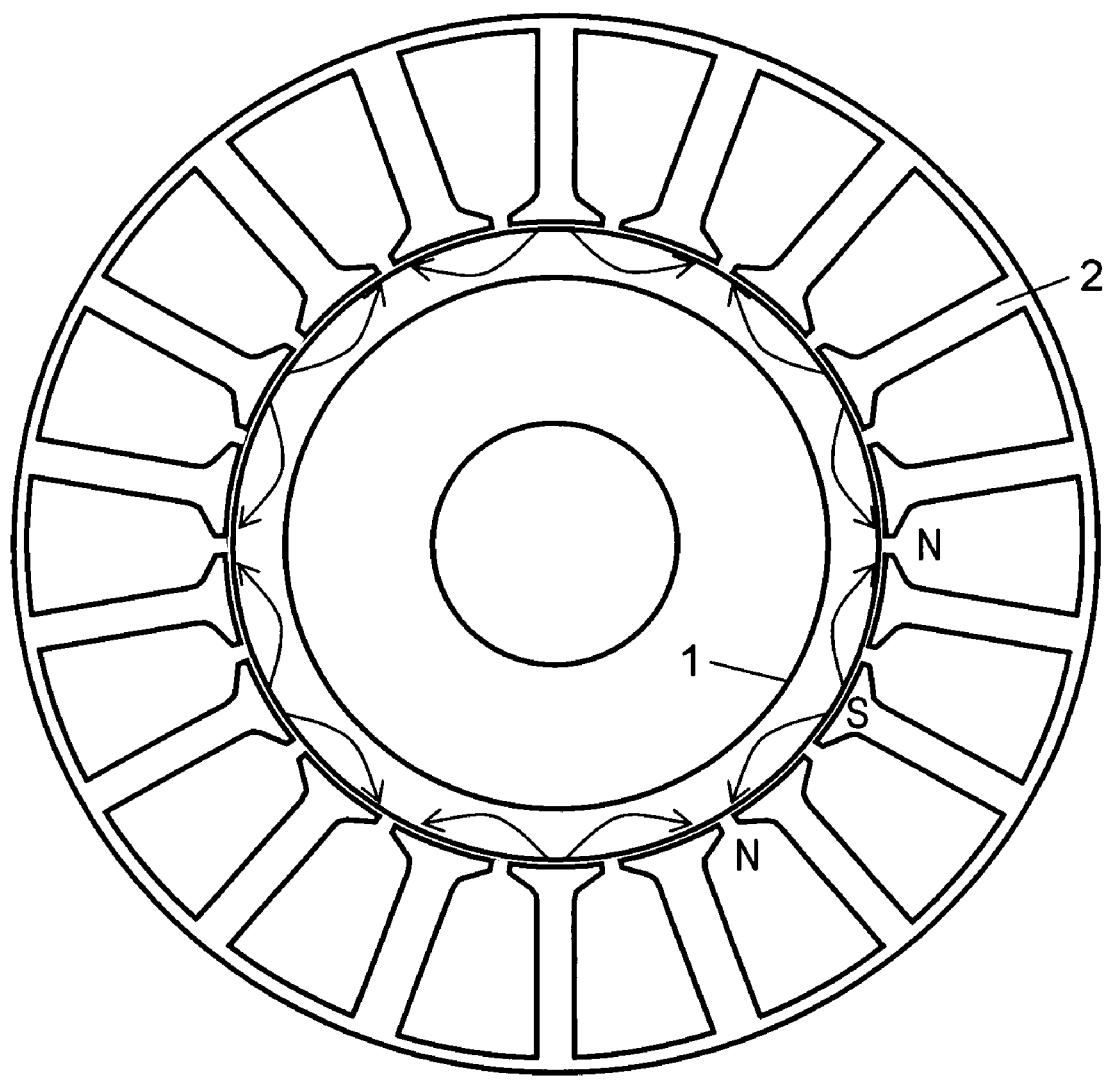
FIG. 12 is a conceptual diagram showing the magnetization pattern of an isotropic magnet.

Next, referring to FIG. 8B, it is apparent that the cogging torque of the radial-direction gap type magnet motor is largely dependent on the direction change degree $M\theta/\phi p$ of the static magnetic field Ms with respect to the mechanic angle $\phi p$ between magnetic poles having different polarities in the region of the mechanic angle $\phi p$ (45°)×0.1° of the magnetic pole. That is, when the direction change degree $M\theta/\phi p$ of the magnetization vector M with respect to the mechanic angle $\phi p$ between magnetic poles having different polarities in the region of the mechanic angle $\phi p$ (45°)×0.1° of the magnetic pole is set to be 0.7 or less even in the radial-direction gap type magnet motor mounted with the magnetic anisotropic magnetic pole whose energy density (BH) max is larger by approximately 2 to 10 times, it is possible to reduce the cogging torque to be equal to or smaller than those of conventional Examples 2 and 3 having the magnetization pattern shown in FIG. 4.

In addition, the induced voltage value proportional to the torque density of the radial-direction gap type magnetic anisotropic magnet motor was 24.1 V in Example 1 (155 kJ/m³), while those of conventional Example 1 (155 kJ/m³) and conventional Example 2 (80 kJ/m³) having the same structure and dimension were 25.1 V and 18 V, respectively.

As described above, in Example 1 according to the invention, the torque density decreases by 4% and the cogging torque decreases by 50% compared with the conventional magnetic anisotropic magnetic poles, and the torque density increases by 34% and the cogging torque decreases by 21% compared with conventional Example 2 (80 kJ/m³) subjected to the sine-wave magnetization. That is, according to the invention, it is possible to suppress the increase of the cogging torque of the radial-direction gap type magnetic anisotropic magnet motor by means of the increase in energy density (BH) max and to increase the torque density. Accordingly, it is expected that the power saving, resource saving, decrease in size, and silencing are facilitated.

INDUSTRIAL APPLICABILITY

The motor according to the invention has a non-radial magnetic anisotropic region provided in a magnetic pole end and can be used as a motor characterized with a low cogging torque and a high torque density. Accordingly, the motor can be widely used in industries.

The invention claimed is:

1. A radial-direction gap type magnet motor comprising:
a magnetic anisotropic magnetic pole which has $M\theta=75$ to 90° in a region of a circumferential magnetic pole center and $M\theta/\phi p \leq 7$ in a region of a magnetic pole end of $\phi p \times 0.1°$, when $\phi p$ denotes a mechanic angle of the magnetic poles, and $M\theta$ denotes an angle of a magnetization vector M with respect to a line tangential to a circular arc having a radial magnetic pole center.

2. The radial-direction gap type magnet motor according to claim 1, wherein a circular arc magnetic pole is obtained by deforming a deformed magnetic pole having $H\theta$ formed between inner and outer peripheral sections corresponding to an arbitrary $\phi p$ and a direction of a homogeneous external magnetic field Hex, $M\theta$ corresponding to the arbitrary $\phi p$ is equal to $H\theta$.

3. The radial-direction gap type magnet motor according to claim 1, wherein in the respective region of the circumferential magnetic pole center, $M\theta$ is set to be 90°, and an average error thereof is set to be 5° or less.

4. The radial-direction gap type magnet motor according to claim 1, wherein in the respective region of the circumferential magnetic pole end of $\phi p \times 0.1°$, a linear approximation stands between $\phi p$ and $M\theta$ with a correlation coefficient of 0.99 or more.

5. The radial-direction gap type magnet motor according to claim 2, wherein the deformation is a shear flow action, an extension flow action, and a viscous deformation having the shear flow action and the extension flow action, of a molten linear polymer caused by a heat and an external force.

6. The radial-direction gap type magnet motor according to claim 2, wherein a variation in anisotropic dispersion σ during the deformation is 0.5 or less.

7. The radial-direction gap type magnet motor according to claim 1, wherein the magnetic anisotropic magnetic pole has a magnetic performance with a residual magnetization $Mr \geq 0.95$ T, an intrinsic magnetic coercive force $HcJ \geq 0.9$ MA/m, and an energy density $(BH) max \geq 150$ kJ/m³.

8. The radial-direction gap type magnet motor according to claim 1, wherein the magnetic anisotropic magnetic pole has a macro structure in which $Nd_2Fe_{14}B$-based rare-earth magnet particles each having an average particle diameter of 150 µm or less are isolated by a matrix (continuous phase) of a bonding agent and $Sm_2Fe_{17}N_3$-based rare-earth magnet fine powders each having an average particle diameter of 3 to 5 µm.

9. The radial-direction gap type magnet motor according to any one of claims 1 to 6, wherein the volume ratio of a magnet material having an energy density (BH) max of 270 kJ/m³ or more is set to be 80 vol. % or more based on the magnetic anisotropic magnetic pole, and the magnetization field Hm is set to be 2.4 MA/m or more.

10. A radial-direction gap type magnet motor in which when $M\theta$ denotes an angle of a magnetization vector with respect to a line tangential to a circular arc having a radial magnetic pole center, $M\theta=75$ to 90° in a region of a circumferential magnetic pole center where $\phi p=\phi t$, wherein $\phi p$ denotes a mechanic angle of magnetic poles and $\phi t$ denotes a mechanical angle of stator core teeth, and $M\theta$ continuously decreases from the region of the circumferential magnetic pole center to a region of a magnetic pole end.

11. The radial-direction gap type magnet motor according to claim 10, wherein $M\theta$ changes as a first degree function of $\phi p$ from the region of the circumferential magnetic pole center to the region of the magnetic pole end.

* * * * *